United States Patent

[11] 3,601,718

[72] Inventor Robert F. Arnesen
4 Mansfield Lane, Camarillo, Calif. 93010
[21] Appl. No. 823,820
[22] Filed May 12, 1969
[45] Patented Aug. 24, 1971

[54] VOLTAGE-CONTROLLED ATTENUATOR AND BALANCED MIXER
11 Claims, 4 Drawing Figs.

[52] U.S. Cl. .......... 333/81 R, 323/77, 325/449, 330/145, 332/52
[51] Int. Cl. .......... H03h 7/24
[50] Field of Search .......... 333/81; 332/43 B, 52; 323/74, 77; 330/145; 325/449

[56] References Cited
UNITED STATES PATENTS
3,093,802 6/1963 Chow .......... 333/81 X
3,351,863 11/1967 Riemens .......... 333/81 X

*Primary Examiner*—Herman Karl Saalbach
*Assistant Examiner*—Paul L. Gensler
*Attorneys*—Samuel Lindenberg and Arthur Frelich

ABSTRACT: A voltage-controlled attenuator is disclosed for signal gain control, modulation and switching, using an inverting transformer coupled to a load through a voltage-dividing network and a diode so forward biased that it attenuates the incoming signal by combining the effects of variable voltage division and signal cancellation. In one embodiment, the diode attenuates the inverted signal sufficiently to cancel a desired amount of the input signal connected to the load from the transformer primary by a resistor and a phase-compensating network if necessary. In another embodiment, the uninverted signal is attenuated and the inverted signal is controlled in amplitude by signal cancellation.

INVENTOR.
ROBERT F. ARNESEN
BY Lindenberg & Freilich
ATTORNEYS.

VOLTAGE-CONTROLLED ATTENUATOR AND BALANCED MIXER

BACKGROUND OF THE INVENTION

This invention relates generally to a voltage-controlled attenuating circuit for various applications such as signal gain control, modulation and switching.

Ever since the advent of active semiconductor devices, the control of signal amplitudes within a system has been a major problem. Much work has been done on, and a great deal of literature has been devoted to, the design of gain control and attenuator circuits required to handle large dynamic ranges. However, such methods depend upon the operating parameters of the semiconductors which change as a function of bias thus causing changes in the frequency characteristics and linearity of the device. Attempts to compensate for these effects result in complex circuits which are therefore more expensive, space consuming, and difficult to adjust for maximum results.

In more recent years there has been a trend toward the use of diodes in various schemes for controlling signal levels, such as disclosed in U.S. Pat. No. 2,808,474. These circuits are relatively less complicated than those involving transistors and can therefore be built into a much more restricted space, but they suffer from a variety of problems such as limited bandwidths, excessive distortion, relatively poor dynamic range, and undesirable insertion losses. Again, as in the case with transistors, many compensating methods have been evolved but the results are essentially the same.

SUMMARY OF THE INVENTION

In accordance with the present invention, an AC signal is split into two parts, one inverted by a transformer. The primary of the transformer is connected to an output load by means of a network which may include phase compensation. The secondary of the transformer is connected to a voltage divider the output of which is then connected to the load by voltage variable resistance in the form of a semiconductor device preferably biased for operation in that portion of its characteristic curve where resistance varies as a substantially linear function of current.

For some applications, the secondary of the transformer is coupled to the load through the semiconductor device, and for other applications, the secondary is coupled directly to the load. Thus, for a low-impedance load, transformer coupling to the load may be employed directly from the voltage-dividing resistors with an appropriate turn ratio for impedance matching as well as through the semiconductor device. In either case, voltage-dividing resistors are employed across the secondary with values selected to provide the desired input impedance across the primary. If the resistance of the network coupling the primary to a load is large compared to that input impedance, the load will not affect it.

DESCRIPTION OF THE PREFERRED EMBODIMENTS

Although the novel circuits to be described will frequently be referred to as voltage-controlled attenuators, such as for automatic gain control or RF switching, it should be noted that they can also be used as modulators by the simple expedient of so biasing them as to null the input signal and then superimposing a modulation voltage on the bias line. When used in that manner, their operation will be essentially the same as a balanced mixer, but the result will be superior to those in common use. The primary characteristic contributing to their superiority is a considerable reduction in the magnitude of their nonlinear products compared to conventional diode attenuators. This results not from the particular type of voltage variable resistance used but from its location in the circuits.

Figure 1:
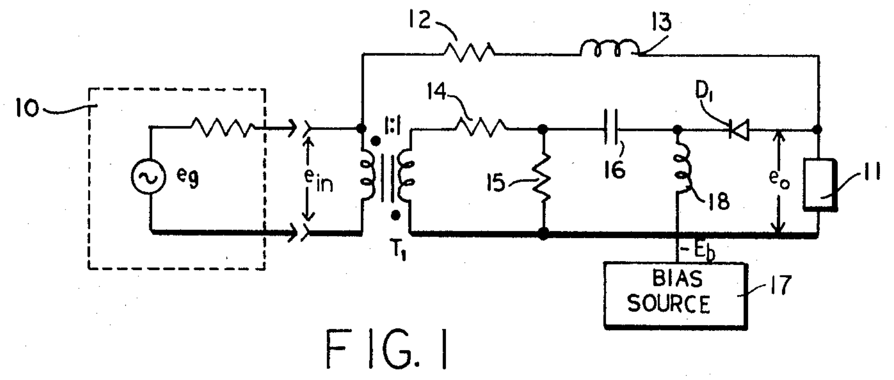
FIG. 1 is a circuit diagram of a preferred embodiment of the present invention for relatively restricted frequency applications.

Referring now to FIG. 1, a voltage-controlled attenuator is shown for relatively restricted range applications. An AC signal source 10 is connected to the primary of a transformer $T_1$ and to an output load 11 by a resistor 12 and an inductor 13. The transformer $T_1$ is assumed to be one having a one-to-one ratio, although this need not always be the case. However, the transformer $T_1$ is wound to provide phase inversion between the primary and secondary windings.

A pair of voltage-dividing resistors 14 and 15 are connected across the secondary. A junction between the resistors 14 and 15 is coupled to the load by a capacitor 16 and a semiconductor diode $D_1$ that is biased by a signal $-E_b$ from a source 17 through an RF choke coil 18.

As will be noted hereinafter with reference to the embodiment of FIG. 3, it is not necessary to use a capacitor to couple the voltage divider to the load. In the embodiment of FIG. 1, a capacitor is used to block bias current. The resistor 12 may then be used to set the maximum current level through the diode for a given bias voltage, and to prevent the loss of bias power through the voltage divider.

The resistors 14 and 15 are selected to have a combined series resistance equal to the desired input impedance of the transformer $T_1$ as seen by the source 10. It is considered that the resistor 12 is large as compared to that input impedance so that it will not significantly affect the input impedance.

If we assume the diode $D_1$ is initially biased off, and therefore constitutes an open circuit, then it is clear that the output voltage $e_o$ appearing across the load is given by $$e_o = \frac{e_{in} R_{11}}{R_{11} + R_{12}}$$

If the resistance $R_{11}$ of the load 11 is large with respect to the resistance $R_{12}$ of the resistor 12, the loss in signal amplitude will be small.

Assuming the values of the resistors 14 and 15 are 40Ω and 10Ω, respectively, the input impedance will be 50Ω. When the diode is biased into heavy conduction, the total effective resistance across the output terminal at the load 11 is reduced and the amplitude of the signal from the primary of the transformer $T_1$ is reduced. This is so because with the diode $D_1$ conducting heavily, its resistance is reduced very significantly so that the resistance appearing at the voltage divider output is effectively connected in parallel with the load 11. The signal output voltage is then no longer determined by the resistance ratio of the resistor 12 to the load 11, but rather by the resistance ratio of the resistor 12 to the load 11 having the smaller resistance of voltage voltage divider in parallel. The result is a large loss of signal power through the direct branch comprising the resistor 12. At the same time, the signal voltage coupled across the resistor 15 by the transformer $T_1$ remains essentially the same because the resistance of the resistor 15 is so small compared to the remainder of the resistance in the circuit.

As the value of the bias current through the diode $D_1$ is increased, the diode resistance is decreased and less of the signal through the direct branch appears across the load 11. It can be seen that for some value of diode bias (resistance), the signal voltage coupled across the load 11 through the direct branch will just equal in amplitude the signal voltage coupled across the load 11 through the transformer $T_1$. If the inductor 13 is properly selected to bring the phase difference between the two paths to 180°, one will cancel the other and the signal voltage across the load 11 will be zero. Thus the diode $D_1$ is used as a voltage variable resistance to control the signal amplitude across the load 11.

One of the basic problems in voltage-controlled attenuation circuits is their nonlinearity, and the consequent production of spurious signals and cross modulation. It should be noted that in the circuit of FIG. 1 the diode $D_1$ is so located that when it is not conducting, because there is little or no bias current through it, the gain of the device is maximum. This is because the circuit to the left of the diode $D_1$ is then essentially disconnected, i.e. it neither loads across the output resistance, nor provides any signal across the output resistance. Distortion is therefore minimized because the input signal through the diode is smallest at this time and, although the DC bias may be small, it is large compared to the change in current to be expected from the input signal. As the bias current through the diode $D_1$ is increased, the circuit to be left of the diode $D_1$ (together with the series resistance of the diode) loads increasingly across the output resistance (load 11), and the signal coupled across the load through the direct path falls for the reasons noted hereinbefore. At the same time, more and more of the transformer-coupled signal will appear across the load. At some particular value of bias current cancellation will occur. Distortion is still minimized because the decreasing diode resistance prevents the signal amplitude at the output load from changing significantly while, at the same time, the increasing bias current moves its operational point into an even more linear portion of the diode characteristic. The increased stability of the operating point as a result of the greater bias current and signal cancellation effects also contribute to reduction of distortion products. Thus, most any semiconductor diode may be employed, or even a transistor. There are several commercially available diodes that are reasonably well suited for use as a voltage controlled resistance device, such as the American Electronics G7515 DIAT which is designed particularly for use as a voltage controlled resistance.

Figure 2:
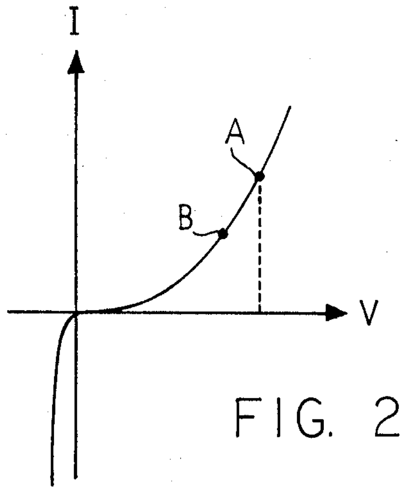
FIG. 2 is a characteristic curve of a typical semiconductor diode used in the present invention.

Considering a characteristic curve of a typical diode shown in FIG. 2, it may be readily appreciated that the bias point selected for a null across the load may be at point A. As the bias voltage $E_b$ is decreased, to a point B, the series resistance of the diode is increased in a substantially linear manner, thereby increasing the signal across the load 11 from the primary winding of the transformer $T_1$. The null at the bias point A is established by the ratio of the resistor 14 to the resistor 15 and the turns ration of the transformer $T_1$. For modulation of an RF signal, the bias voltage $E_b$ may be caused to vary between points A and B in response to a modulation voltage. RF switching is also possible by simply switching the bias voltage between points A and B.

Another advantage of the present invention besides low distortion is that, unlike other type of attenuators used to date, it is capable of operating with a dynamic range on the order of 75 db. or more over a wide frequency range using only one diode. Similar ranges are attainable in conventional circuits using as many as six diodes, but the distortion products are severe and their frequency characteristics are poor.

Other advantages that are very desirably in some applications are: a relatively short time constant; and the differential time delay as a function of attenuation is essentially constant. It can, therefore, follow rapid changes in input signal levels and be used to great advantage in receivers having tight gain and phase tracking requirements. There are also the advantages of low cost and simplicity for mass production.

As noted hereinbefore, there is a phase shift in the transformer-coupled signal appearing across the load 11 due to the mutual inductance of the transformer $T_1$ and the self-inductance of its secondary. Those inductances are not present in the direct branch for the uninverted signal. It can be shown by standard analyses of an equivalent circuit comprising series inductances for the primary and secondary self-inductances, and shunt inductance between the series inductances for the transformer mutual inductance, that the undesired phase shift can be eliminated by setting the phase shift equal to zero and solving for the required coefficient of coupling, $k$, for the transformer. However, since the required value of $k$ would, in most cases, be impractical due to both magnitude and tolerance characteristics, it would be more feasible to use a transformer with a more readily realizable coefficient of coupling on the order of perhaps 95 percent to minimize insertion losses. Then a compensating inductance may be introduced in the direct branch for the uninverted signal in the form of the inductor 13. If the resistor 12 is large compared to the other resistors in the network, the tangent of the phase angle resulting at the time when the diode resistance is minimum from the addition of inductor 13 is series with it is essentially tan $\theta = \omega L/R$ where $L$ is the inductance of the inductor 13 and $R$ is the resistance of the resistor 12. By solving for $L$ using the same value for $\omega$ employed to find the phase angle $\theta$ to be compensated, the size of the inductor 13 is established. However, if the compensating inductance $L$ is determined for a particular signal frequency, at some higher frequency the compensating phase shift will be a few degrees less than the phase shift through the transformer $T_1$. Accordingly, the circuit of FIG. 1 is suitable only for applications over a limited range of signal frequencies.

In some applications, both the signal frequency and the coefficient of coupling for the transformer are chosen. In that event, the transformer inductance becomes fixed and no compensating inductance is necessary in the direct branch comprising the coupling resistor 12. Such a circuit would be very effective at low frequencies where any phase differential in the two branches would be so low as to preclude the necessity for any phase compensating element.

For other wide frequency range applications, what is needed is compensating inductive reactance in the direct branch which increases with frequency at an appropriate rate to maintain a zero phase difference. That may be accomplished by substituting series reactance for the series inductance. That is readily done by placing the capacitor 16 in series with the inductor 13 as shown in FIG. 3 where a prime in the reference characters signifies elements corresponding to elements in the circuit of FIG. 1, but in a new location. Since the bias source 17' is now connected between the anode of the diode $D_1$ the polarity of the bias $E_b$ is reversed.

To find the value of the capacitor 16' and the inductor 13 required in the circuit of FIG. 2 for a range of 10 MHz. to 30 MHz., for example, a pair of simultaneous equations may be solved of the form $X_L - X_C = X_T$ for each of the two end points 10 MHz., where the reactances $X_L$, $X_C$ and $X_I$ are of the inductor 13, capacitor 16' and transformer circuit $X_T$.

Figure 3:
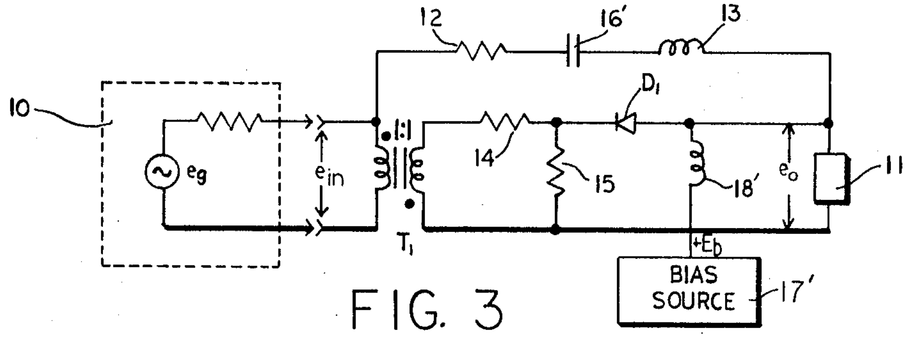
FIG. 3 is a circuit diagram of a preferred embodiment of the present invention for relatively broadband frequency applications.
Figure 4:
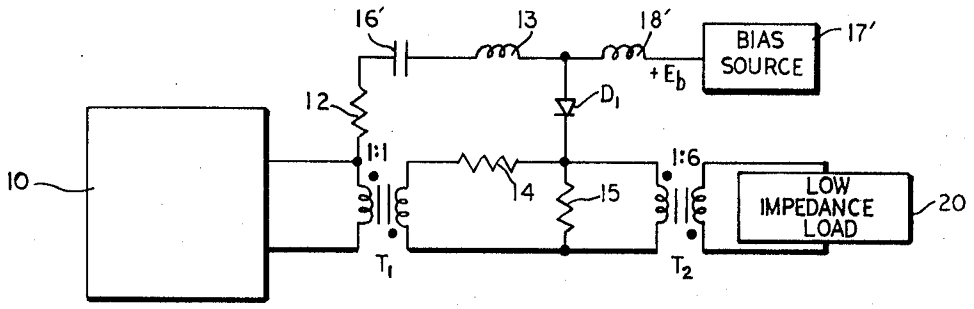
FIG. 4 is a variant of the circuit of FIG. 1.

While the circuits of FIGS. 1 and 3 will provide excellent results when used in most applications, they will exhibit excessive losses when coupling into a transmission line because they are designed to operate between a low-impedance source, such as a transmission line, and a high-impedance load. For coupling into a low-impedance load, a second step-up transformer $T_2$ may be employed for impedance matching as shown in FIG. 4 for a low-impedance load 20. However, for very low signals, the signal-to-noise ratio at the primary winding of the transformer $T_2$ may not be sufficiently high due to the signal loss in the voltage-dividing circuit comprising resistors 14 and 15. The signal-to-noise ratio may be significantly improved by a high step-up turns ratio for the transformer $T_1$. The transformer $T_2$ may then have a one-to-one turn ratio.

From the foregoing, it should be appreciated that an improved voltage-controlled attenuator has been disclosed for various applications, such as attenuating, modulating or switching RF signals. However, it should be recognized that many modifications will occur to those skilled in the art, such as the use of shunt compensation instead of series compensation for phase shift, or both series and shunt compensation for various frequency ranges. In addition, various impedance-matching techniques may be employed at the input and output to couple to and from high and low-impedance loads and sources. Accordingly, inasmuch as it is recognized that modifications and variations falling withing the spirit of the invention will occur to those skilled in the art, it is not intended that the scope of the invention be determined by the disclosed exemplary embodiments, but rather should be determined by the breadth of the appended claims.

What is claimed is:

1. A voltage-controlled attenuator comprising:
a signal source of predetermined frequency range;
a voltage-dividing network having an input terminal and an output terminal;
an inverting transformer coupling said signal source to said input terminal of said voltage-dividing network;
a summing junction;
a voltage variable resistance element coupling said output terminal of said voltage-dividing network to said summing junction;
a noninverting circuit branch comprising a series resistor coupling said signal source to said summing junction;
a source of impedance control voltage; and
means for connecting said source of impedance control voltage to said voltage variable resistance element, whereby the attenuation of a signal being transmitted from said signal source to said summing junction is controlled by said source of impedance control voltage.

2. A voltage-controlled attenuator as defined in claim 1 wherein said voltage variable resistance element comprises a semiconductor device biased by said impedance control voltage.

3. A voltage-controlled attenuator as defined in claim 2 wherein said noninverting circuit branch further comprises means for compensating for any phase shift in signals coupled to said compensating for any phase shift in signals coupled to said load input terminal through said transformer, whereby noninverted signals coupled to said summing junction through said circuit branch are 180° out of phase with signals coupled to said summing junction through said transformer.

4. A voltage-controlled attenuator as defined in claim 3 wherein said phase-shift-compensating means comprises a reactance circuit.

5. A voltage-controlled attenuator as defined in claim 4 wherein said reactance circuit is connected in series with said resistor.

6. A voltage-controlled attenuator as defined in claim 5 wherein a load is connected to said summing junction.

7. A voltage-controlled attenuator as defined in claim 5 wherein a load is coupled to said voltage dividing network by a second transformer having its primary winding connected to said output terminal of said voltage-dividing network.

8. A voltage-controlled attenuator for coupling an alternating signal from a source to a load, comprising
an inverting transformer having a primary winding adapted to have end terminals thereof connected to said signal source, and secondary winding having only end terminals,
a pair of resistors connected in series between said end terminals of said secondary winding to form a voltage divider to provide at an output terminal between said pair of resistors a predetermined fraction of an inverted signal induced across said secondary winding,
voltage-controlled resistance means having first and second terminals, said means being responsive to a bias voltage for controlling the resistance between said first and second terminals thereof, said first terminal being coupled to said output terminal of said voltage divider formed by said pair of resistors,
impedance means coupling one end terminal of said primary winding to said second terminal of said bias-controlled resistance means,
means for providing said bias voltage to said voltage-controlled resistance means, and
means for coupling said load between one of said first and second terminals of said voltage-controlled resistance means and one of said end terminals of said secondary winding.

9. The combination of claim 8 wherein said voltage-controlled resistance means comprises a forward biased semiconductor diode.

10. The combination of claim 8 wherein said impedance means comprises a resistor.

11. The combination of claim 10 wherein said coupling means is comprised of a transformer having a primary winding with end terminals thereof connected to ends of one of said pair of resistors forming said voltage divider and a secondary winding having end terminals thereof adapted to be connected to said load.